Feb. 20, 1923.

C. F. KING.
BEARING SLEEVE.
FILED DEC. 23, 1921.

1,445,693.

Inventor -
Clifton F. King
by Chapin & Neal,
Attorneys.

Patented Feb. 20, 1923.

1,445,693

UNITED STATES PATENT OFFICE.

CLIFTON F. KING, OF LUDLOW, MASSACHUSETTS.

BEARING SLEEVE.

Application filed December 23, 1921. Serial No. 524,417.

*To all whom it may concern:*

Be it known that I, CLIFTON F. KING, citizen of the United States, residing at Ludlow, in the county of Hampden and State of Massachusetts, have invented new and useful Improvements in Bearing Sleeves, of which the following is a specification.

The present invention relates to improvements in shaft bearings and more particularly to a removable bearing sleeve for connecting rods.

Although not limited thereto the present invention is especially useful for renewing the bearing surfaces of connecting rods such as are employed in the engines of Ford automobiles for connecting the pistons with the crank shaft. A connecting rod of this character has a removable cap which cooperates with one end of the rod to encircle the crank shaft and the bearing recesses of the rod and cap are lined with relatively soft bearing material such as babbitt. When the bearing surface becomes worn it is customary to file or machine the abutting faces of the rod and cap at opposite sides of the bearing to take up the play between the bearing surface and the crank shaft. This procedure involves an expenditure of considerable time and labor and furthermore the results obtained are unsatisfactory since when the rod is again connected with the crank shaft the curved bearing faces will be slightly eccentric to the axes of the crank shaft due to the fact that as a result of the filing operation the diameter of the bearing recess has been shortened in the direction lengthwise of the connecting rod but not in the direction perpendicular to the length of the rod.

One object of the present invention is to provide a bearing sleeve of novel and improved construction which may be readily and quickly applied to connecting rods of the above described character either to replace a worn bearing surface, or to provide a suitable bearing surface in the first instance and which will in either case, accurately fit the crankshaft and be adapted for rigid assembly with the connecting rod.

With this and other objects in view, as will hereinafter appear, the invention consists in the features of construction and arrangement of parts hereinafter described and claimed the advantages of which will be apparent to those skilled in the art.

The invention will be readily understood from the accompanying drawings, illustrating what is now considered to be its preferred embodiment, and from the following description of the illustrated device.

In the drawings:—

Figure 4:
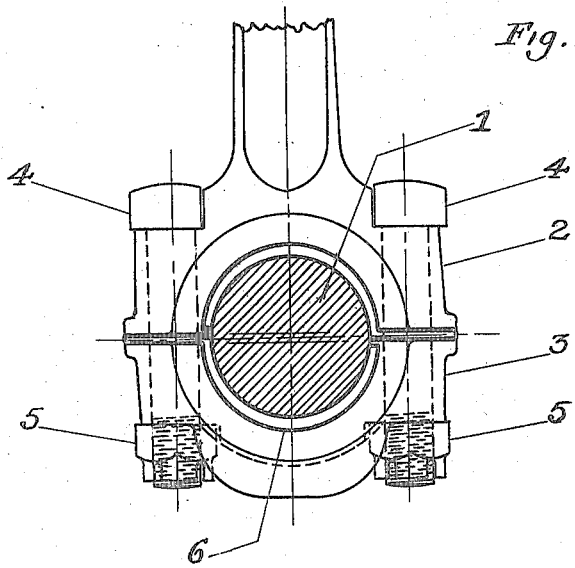
Fig. 4 is a view, partially in elevation and partially in section, showing a portion of a connecting rod fitted with the improved bearing sleeve and connected with a crank shaft.

Referring to Fig. 4, one end of a connecting rod 2 is apertured to provide a bearing for a crank shaft or crank pin 1 and is split transversely in the usual manner to provide a removable cap 3 for facilitating the connection of the rod with the shaft. As shown, the cap 3 is secured in place upon the end of the rod 2 by means of the usual bolts 4 which extend through laterally projecting ears upon the rod and cap and are screw-threaded to receive the nuts 5.

In accordance with the present invention, the improved bearing sleeve which is adapted to be fitted within the bearing recess of the connecting rod is longitudinally divided along an axial plane to provide two separated parts or sections 6 each of which is a duplicate of the other. As shown, each bearing sleeve section 6 is provided at one of its longitudinal edges with an outturned flat lip 7. The sleeve sections 6 are adapted for assembly within the connecting rod bearing in the relation shown in Fig. 4 with the lips 7 disposed in alinement at diametrically opposite sides of the bearing and interposed between the adjacent laterally projecting ears of the rod and its cap. The lips 7 are apertured, as shown at 8 to receive the bolts 4, this arrangement positively insuring against possibilty of end play of the bearing sleeve sections. The construction of the connecting rod is such that the cylindrical bearing aperture will walls of the described bearing aperture will be concentric with the axis of the crank shaft or crank pin when the adjacent portions of said rod and cap at opposite sides of said bearing recess are brought into actual contact with each other. It is usual practice to line the bearings of connecting rods with babbitt or other suitable bearing material, as hereinbefore set forth. One advantageous use of the present invention is for the purpose of renewing the connecting rod bearings when the same have become worn. The invention is further adapted, however, for application to a connecting rod or other pivotally mounted member to provide the original bearing surfaces thereof.

Figure 1:
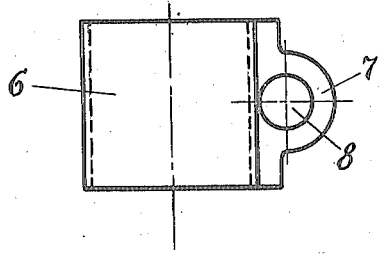
Fig. 1 is a top plan view of one section of a longitudinally divided two-part bearing sleeve constructed in accordance with the present invention.
Figure 2:
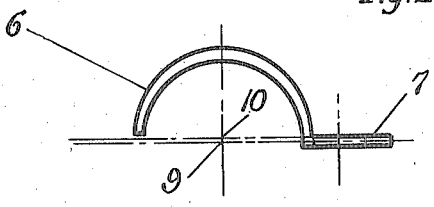
Figs. 2 and 3 are views in end and side elevation, respectively, of the bearing sleeve section shown in Fig. 1.
Figure 3:
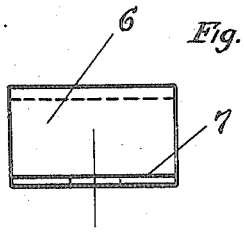

By reason of the above described construction of the connecting rod it is obvious that when the cap 3 and the adjacent end of the rod 2 are separated from one another by the insertion between them of the lips 7 of the bearing sleeve sections, the opposed cylindrical faces of the rod and cap will be eccentric to the center of the bearing aperture and consequently if the sleeve which fits within said aperture has walls of uniform thickness, i. e., if the inner and outer surfaces of each sleeve section are concentric with one another, the inner surfaces of both sleeve sections will necessarily be eccentric to the center of the bearing aperture and therefore these sections will not conform to the curvature of the crank shaft which is to be journaled therein. Accordingly an important feature of the invention contemplates the making of the bearing sleeve sections with their inner and outer cylindrical surfaces eccentric to each other, the outer faces being shaped to fit the bearing on the connecting rod while the inner faces of said sections are arranged to be concentric with the center of the bearing aperture in the connecting rod when said sections are fitted within said aperture. The eccentricity of the inner and outer faces of the bearing sleeve sections is indicated clearly in Fig. 2 wherein the center of curvature of the inner face is indicated at 9 and the center of curvature of the outer face is indicated at 10. Thus the inner surfaces of said sleeve sections will be concentric with the axis of the crank shaft or pin journaled in the bearing sleeve and consequently they will fit closely throughout their entire area against the surface of said shaft or pin.

As shown in Fig. 4, the bearing sleeve sections are further so constructed that when assembled the unlipped longitudinal edges of each section will be spaced a slight distance from the opposed lip of the other sleeve section. The advantages of this arrangement are twofold. First, the provision of the described space between the adjacent lipped and unlipped edges of the sleeve sections facilitates proper lubrication of the bearing by permitting oil to readily penetrate through said spaces to the interior of the bearing. Further, this arrangement permits a certain amount of adjustment of the sleeve sections toward and from each other to take up play between said sections and the crank shaft. This adjustment may be easily effected by removing the sleeve sections and filing or machining the faces of the lips 7 so that the sleeve sections will approach each other more closely when reassembled.

It will be noticed that the two sleeve sections, being exact duplicates, are interchangeable and consequently when assembling no care need be exercised to select complemental members. The design of the sleeve sections is such that they are inexpensive to manufacture. When used for the purpose of renewing a worn bearing surface in a connecting rod such as above described, the sleeve sections may be readily applied to the rod upon the removal of the cap therefrom and it will not be necessary to disassemble the connecting rod from the engine and to machine the abutting portions of the rod and its cap as has been the usual practice heretofore. Furthermore, the use of the present sleeve sections to renew the bearing surfaces insures that the new bearing surfaces will accurately fit the shaft or pin journaled therein and thus more satisfactory results are obtained than by the usual method of taking up play in the bearings by a filing or machining operation. If it becomes desirable to take up for wear upon the bearing sleeve sections, it will be obvious that this may be effected by filing the faces of the lips 7 as already described. This operation may be effected much more readily than adjusting the bearings by machining the abutting portions of the rod and cap inasmuch as the parts of the connecting rod itself are made of steel or other very hard material whereas the lips 7 of the bearing sleeve sections are made of relatively soft material which can be easily filed.

The invention has been disclosed herein for illustrative purposes in an embodiment at present preferred but the scope of the invention is defined by the appended claims rather than by the foregoing description.

What I claim is:—

1. The combination with a crank pin and a connecting rod provided with a split bearing at one end and having bolts for securing together the portions of said bearing, of a bearing sleeve comprising two longitudinally divided sections adapted to fit within said bearing, and out-turned lips on said sleeve sections constructed and arranged to be interposed between the opposed portions of said split bearing to prevent relative turning of said sleeve and rod, said lips being apertured to receive said bolts for the purpose of positively insuring against endwise displacement of said sleeve, and the sleeve sections being so constructed that when assembled in said bearing the opposed longitudinal edge portions of said sections will be spaced apart to permit adjustment of said sections toward and from each other to take up for wear.

2. The combination with a crank pin and a connecting rod provided with a split bearing at one end and having bolts for securing together the portions of said bearing, of a sleeve comprising two longitudinally divided sections adapted to fit within said bearing, and out-turned lips on said sleeve sections constructed and arranged to be interposed between the opposed portions of said split bearing to prevent relative turning of said sleeve and rod, the sleeve sections being so constructed that when assembled in said bearing the opposed longitudinal edge portions of said sections will be spaced apart to permit adjustment of said sections toward and from each other to take up for wear.

3. The combination with a crank shaft and a connecting rod having a cap cooperating therewith to provide bearing faces concentric with the shaft when adjacent portions of said rod and cap are in contact, of a longitudinally divided sleeve fitting within said bearing faces and comprising two interchangeable sections each having an out-turned lip at one end thereof, said sleeve sections being assembled with said lips interposed between said cap and the adjacent end of the connecting rod upon opposite sides of said shaft and the inner surfaces of said sleeve sections being eccentric to the outer faces thereof to enable them to fit closely against said shaft throughout their length when the adjacent portions of said rod and cap are separated by said lips.

4. The combination with a connecting rod having a removable cap for coacting with one end of the rod to encircle a crank shaft, of a bearing sleeve comprising longitudinally divided sections adapted to fit in spaced apart relation within the opposed bearing recesses of said rod and cap said sections having out-turned lips adapted to be arranged in alinement at opposite sides of the crank shaft and to be interposed between said rod and cap to prevent them from turning relatively to said sleeve and said sleeve sections having their inner faces eccentric to their outer faces to enable the former to conform to the contour of the crank shaft after the introduction of said lips between said rod and cap.

In testimony whereof I have affixed my signature.

CLIFTON F. KING.